July 1, 1924.
A. RAY
DIRIGIBLE HEADLAMP
Filed May 18, 1923
1,500,036
4 Sheets-Sheet 1
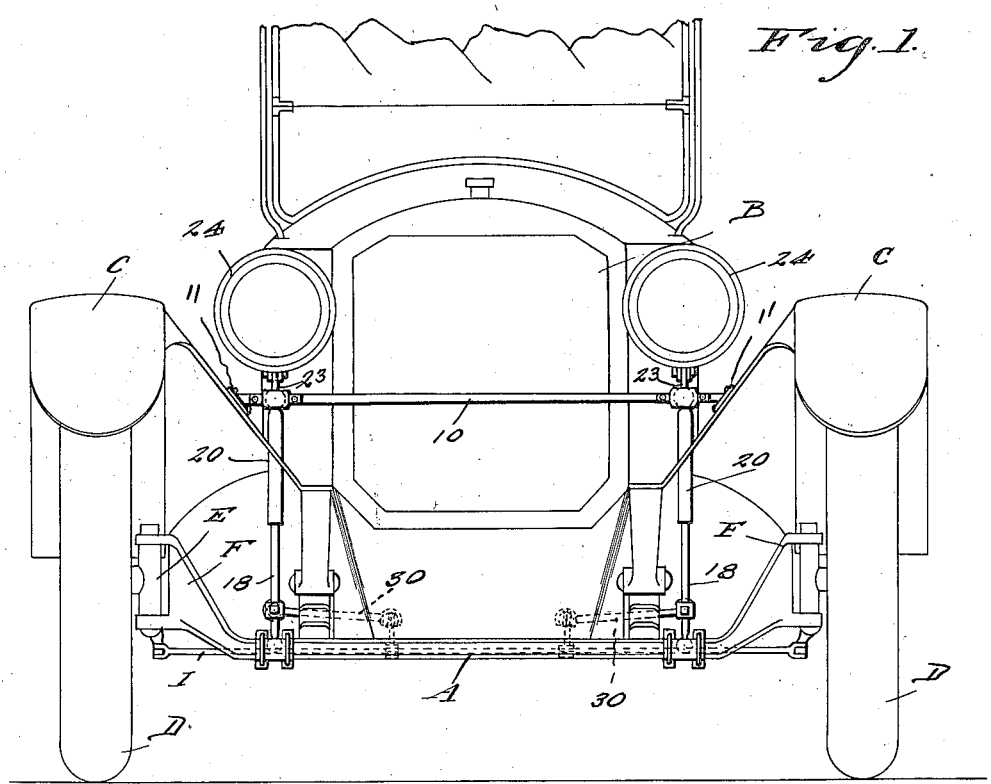
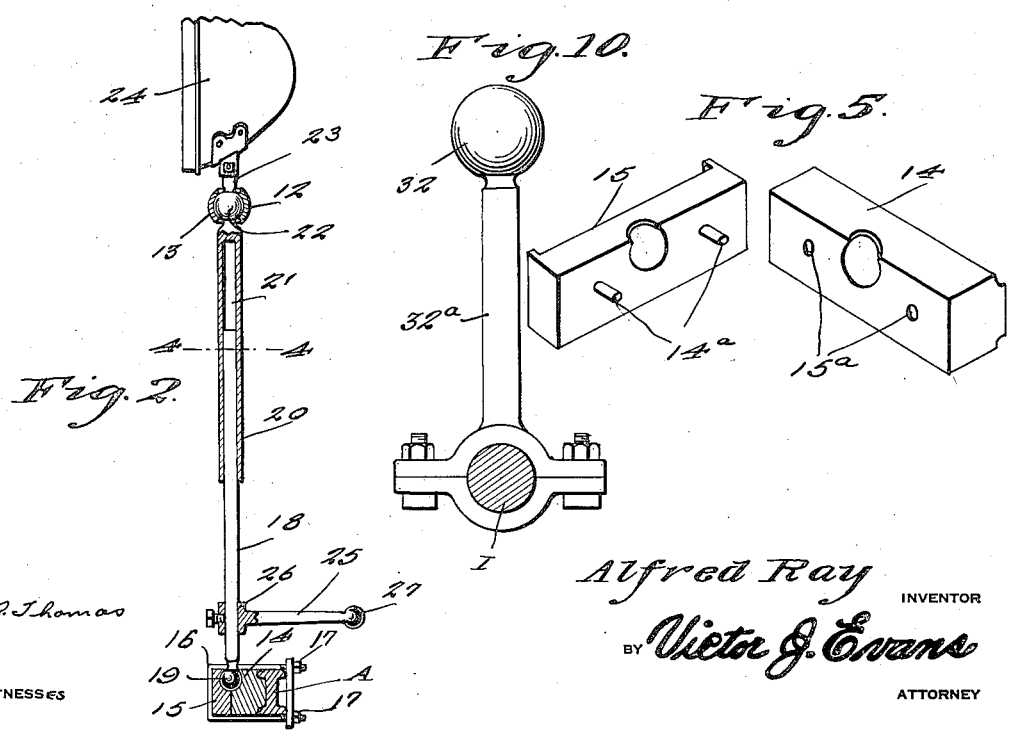
Alfred Ray
INVENTOR
BY Victor J. Evans
ATTORNEY
WITNESSES July 1, 1924.
A. RAY
1,500,036
DIRIGIBLE HEADLAMP
Filed May 18, 1923
4 Sheets-Sheet 2
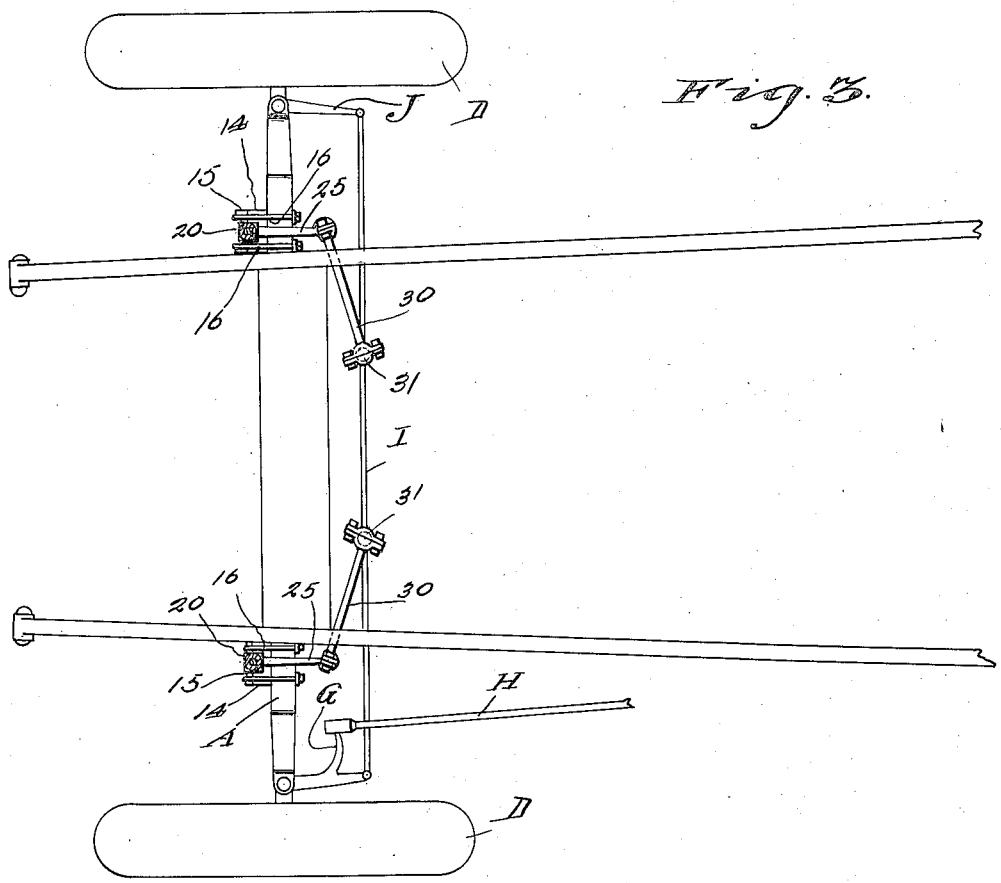
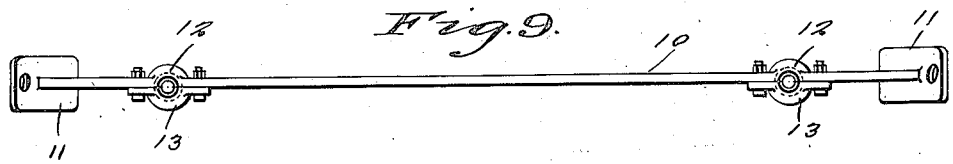
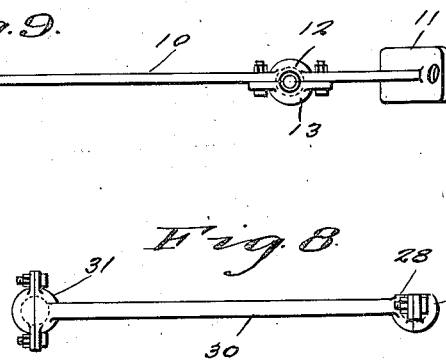
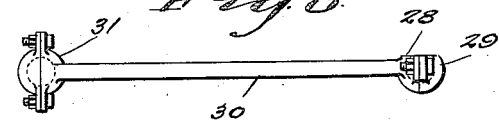
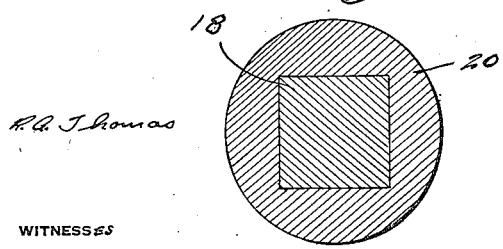
Alfred Ray INVENTOR
BY Victor J. Evans
ATTORNEY

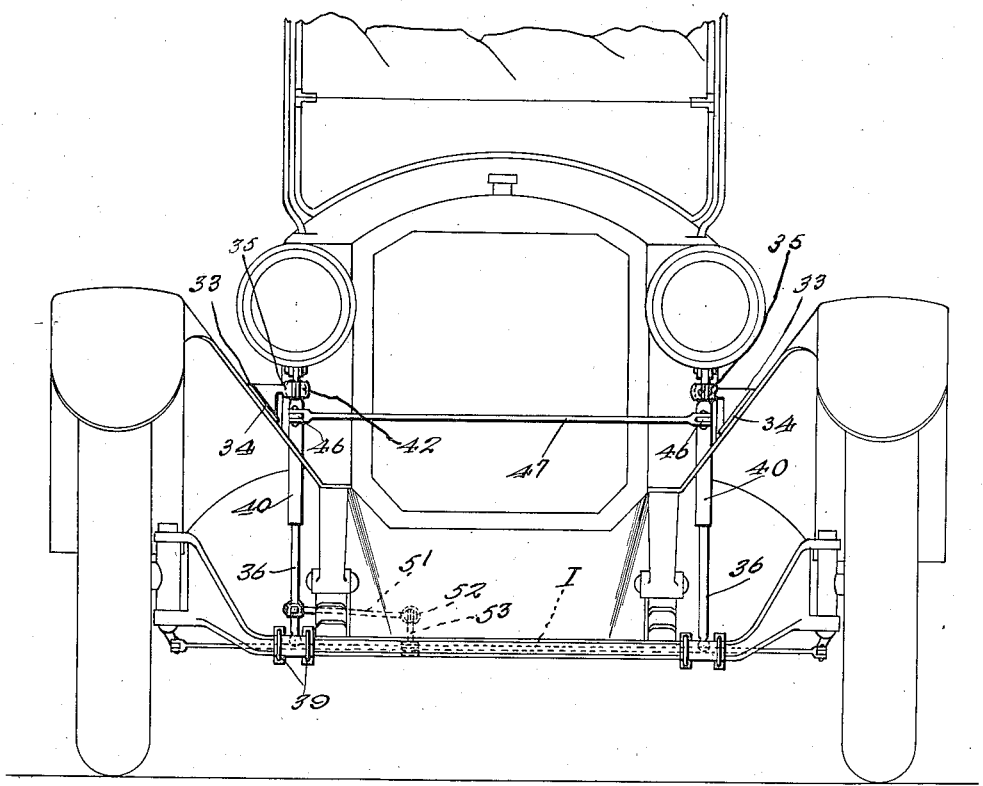
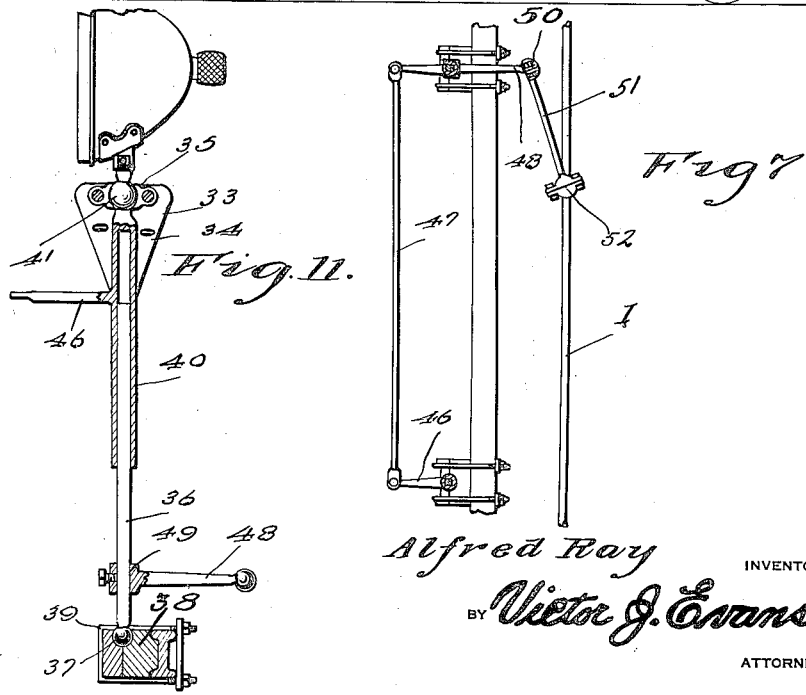

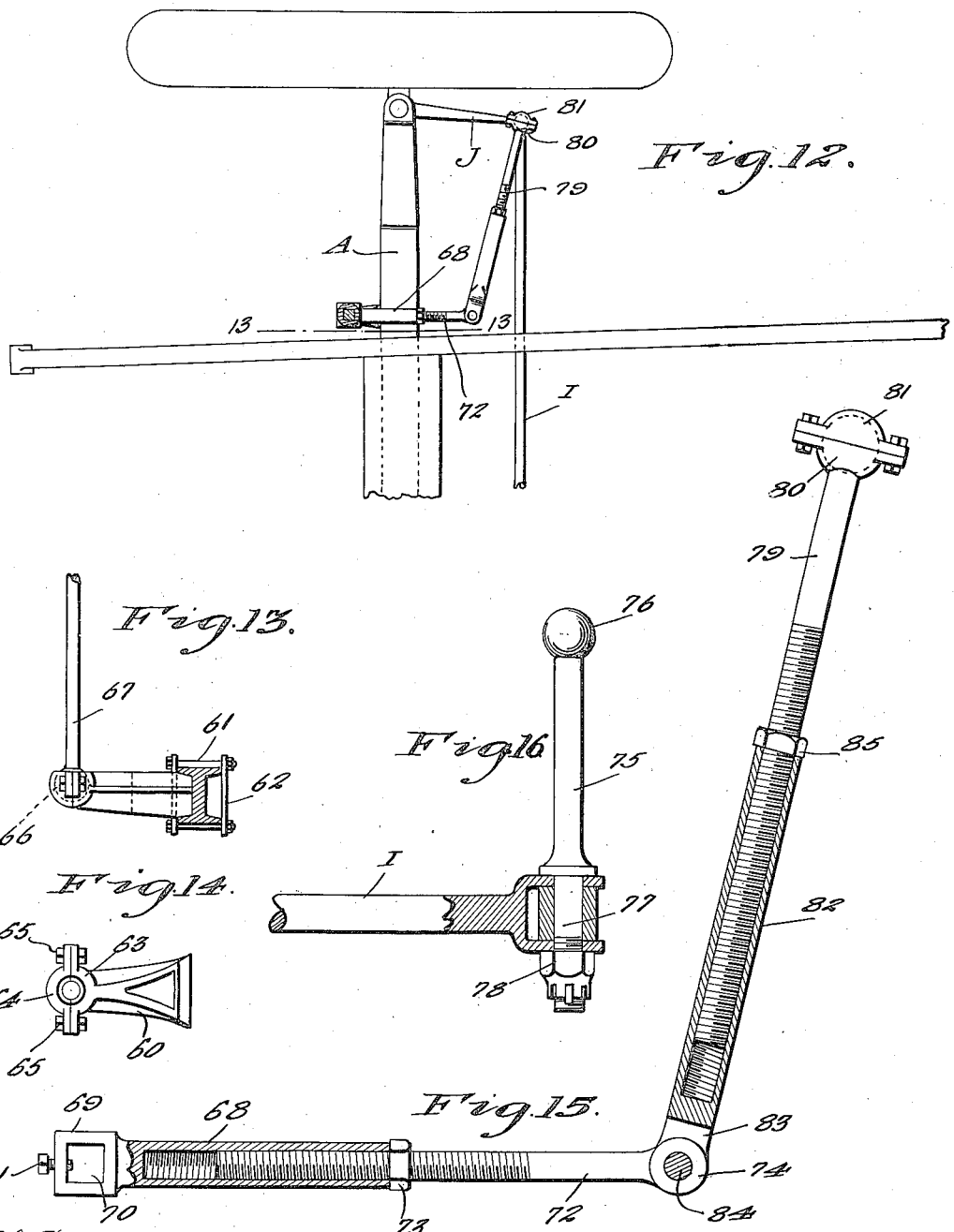

Patented July 1, 1924.

1,500,036

UNITED STATES PATENT OFFICE.

ALFRED RAY, OF SPRING VALLEY, WISCONSIN.

DIRIGIBLE HEADLAMP.

Application filed May 18, 1923. Serial No. 639,919.

*To all whom it may concern:*

Be it known that I, ALFRED RAY, a citizen of the United States, residing at Spring Valley, in the county of Pierce and State of Wisconsin, have invented new and useful Improvements in Dirigible Headlamps, of which the following is a specification.

This invention relates to headlamps for vehicles and has for its object the provision of a novel headlamp mounting and operating means therefor whereby the lamps will turn automatically in accordance with steering of the vehicle, so that the light will always be thrown along the road way immediately in advance of the vehicle regardless of the position of the front wheels, the device having the great advantage of making driving safer by giving proper illumination at all times.

It is well known that the ordinary headlamps will throw their light straight ahead and far off to the side of a road when the vehicle is making a turn, the ground traveled over by the car being actually in darkness. This condition is extremely dangerous especially in mountainous districts where roads make sharp bends, possibly at the edges of ravines and other dangerous places.

An important and more specific object is the provision of a headlamp mounting which is so constructed that the operating parts will yield and accommodate themselves automatically at all times to the position of the vehicle wheels, regardless of whether one wheel drops into a sudden hole, whether one wheel be climbing a bank or whether the wheels be tilted in crossing ditches and the like.

Still another object is the provision of a mounting of this character which is capable of application to already existing vehicle, or capable of being installed as a part of the original equipment, various modifications being permissible to effect mounting upon vehicles of different makes and types.

An additional object is the provision of a structure of this character which will be simple and inexpensive in manufacture, easy to install, adjustable, positive and efficient in service and a general improvement in the art.

With the above and other objects and advantages in view the invention consists in the details of construction to be hereinafter more fully described and claimed and illustrated in the accompanying drawings, in which:

Figure 1 is a front elevation of an automobile equipped with headlamps mounted in accordance with my invention and showing one form of supporting bracket and operating means for the lamps, Figure 2 is a vertical section taken at one of the lamps, this view being on a larger scale than Figure 1, Figure 3 is a plan view of the front axle and steering gear showing the connection of the parts, the lamp standards being in section, Figure 4 is a detail cross section through the lamp turning post, the section being taken on the line 4—4 of Figure 2, Figure 5 is a detail perspective view of the bracket member carried by the axle and showing the parts thereof separated, Figure 6 is a fragmentary front elevation of an automobile showing the lamps mounted in a different type of bracket and differently operated, Figure 7 is a detail plan view of a portion of the steering gear showing the operating means for this modification, Figure 8 is a detail view of the operating arm connected with the steering arm connecting rod, Figure 9 is a detail view looking down upon the lamp mountings, Figure 10 is a detail section through the steering arm connecting rod showing the actuating arm carried thereby, Figure 11 is a vertical section through one of the lamp standards shown in the modification illustrated in Figure 6, Figure 12 is a plan view of one end of the axle and associated parts showing a modified form of actuating means, the lamp standard being in section, Figure 13 is a cross section through the axle of this form showing the socket member carried thereby, the section being taken on the line 13—13 of Figure 12, Figure 14 is a detail plan view of this socket member.

Figure 15 is an enlarged horizontal section through the actuating members of this modification and Figure 16 is a detail section showing the upright arm located at the juncture of the steering arm and steering arm connecting rod.

Referring more particularly to the drawings the letter A designates the front axle of an automobile, B the radiator, C the fenders, D the front wheels which are carried by spindles projecting from spindle bodies E mounted within the usual forks or yokes F on the ends of the axle A. As is well known, one steering spindle body carries an arm G which is moved by a steering rod H operated by movement of the steering wheel. Both spindle bodies E are connected by a steering arm connecting rod I which is connected with the arm G and with an arm J projecting from the other spindle body. All these parts are well known and are substantially the same on practically all types of motor vehicles, such variations as do exist being immaterial.

In carrying out my invention various expedients may be resorted to for supporting the lamps, but in the form shown in Figure 1 I have shown an elongated rod or bar 10 which has its ends formed with attaching feet 11 which are riveted, bolted, or otherwise secured onto the front fenders, though, if preferred, this rod might be differently mounted, for instance by being secured to the front fender stay rods in some types of vehicles. Formed on this bar 10 are socket members 12 provided with caps 13 detachably held in place.

Mounted upon the front axle A is a support including a socket member 14 and a cap 15, both of which are held together and secured upon the axle by U-bolts 16 which embrace this support and the axle and which carry suitable nuts 17. The socket member and cap may be held in proper relation to each other by interfitting dowels and holes 14ª and 15ª respectively.

The post for each lamp consists of a lower section 18 which is rectangular in cross section and which terminates at its lower end in a ball head 19 engaged within the socket 14 and cap 15. The post further includes an upper section 20 which is formed with a bore 21 rectangular in cross section for receiving the lower section 18. Near its upper end the upper section 20 is formed with a ball head 22 engaged within the socket 12 on the bar 10 and held by the associated cap 13. The structure is the same at both ends of the axle. Formed upon or carried by the upper section 20 above the ball head 22 thereon is a fork 23 or other equivalent standard for carrying the headlamp 24. By this means it will be seen that the lamps are capable of rotary movement, and that the axle may move up and down with respect to the body without causing injury to or breakage of the parts of the lamp mountings.

The operating means consists of an arm 25 provided at one end with a rectangular opening 26 slidably engaged upon the rectangular lower section or stem 18 of the lamp supporting post. The other end of this arm terminates in a ball head 27 which is engaged within a socket 28, and held by a cap 29, on one end of a rod 30 which terminates in a socket 31 engaged upon a ball head 32 formed on an arm 32ª clamped upon the steering arm connecting rod I. The operating means is the same for both lamps and all of the above described parts must naturally be duplicated at both sides of the machine, there being two of the ball members 32 and two of the rods 30.

In some types of machines it may be undesirable, or not practical, to provide the bar 10 which extends across the front of the radiator. In such an event I may make use of the mounting shown in certain of the figures, the mounting in this case consisting of brackets 33 formed with inclined attaching bases 34 designed to be secured against the fenders at the sides thereof toward the hood of the vehicle. The shape of the brackets 33 must be such that the socket members 35 carried thereby will be in such position as to support the lamp posts in vertical position. If desired, the operating mechanism above described may be used in exactly the same manner in connection with this type of bracket though as a modification, I have shown the posts as each consisting of a lower stem or section 36 rectangular in cross section and terminating in a ball head 37 fitting within a socket 38, similar to that including the parts 14 and 15, held on the axle by U-bolts 39, the post further including an upper section 40 having a square bore slidably receiving the lower section 36 and carrying a head 41 retained within the socket 35 by a cap 42. Each post carries a lamp as described above. Each post section 40 carries an arm 46 and both arms 46 are connected by a rod 47 for effecting simultaneous movement of the lamps when one is turned by the operating means to be described.

The operating means in this instance consists of an arm 48 corresponding exactly to the arm 25 and likewise formed with an opening 49 adjustably engaged upon the lower section 36 of one lamp post and having a ball and socket connection 50 with a rod 51 which in turn has a ball and socket connection 52 with an arm 53 clamped on the steering arm connecting rod I.

Regardless of which form of the device is used or whether a combination of both be employed, it is quite apparent that when the front wheels of the vehicle are moved to effect steering, the lamps will be correspondingly moved so that their light will be thrown upon the road way in advance of the vehicle at all times regardless of whether travel be upon a straight road or around curves.

In the form of the device shown in Figures 12 to 16 inclusive, I have illustrated a modification of the socket structure which supports the lamp standards and a modification of the actuating means. In these figures, the reference character 60 designates a somewhat elongated bracket disposed against the front of the axle A and held thereon by bolts 61 which pass through a clamping plate 62. The bracket 60 terminates in a socket 63 with which cooperates a cap 64 detachably mounted on the bracket and held by bolts 65. The bracket and cap co-operate matingly and receive the ball head 66 on the lower end of the lower lamp standard section 67. The remainder of the lamp standard structure is exactly the same as in the above described forms.

The operating means for turning the lamp standards includes an elongated arm 68 which is provided at one end with a head 69 formed with an opening 70 and slidably adjustably engaged upon the standard section 67, adjustment being maintained by a suitable set screw 71 or the like. The arm 68 is tubular and internally threaded and receives the threaded end of a rod 72, a suitable lock nut 73 being provided for locking the parts in adjusted position. At its outer end the rod 72 terminates in an eye 74.

In this form of the device the usual bolt which connects the steering arm J with the steering arm connecting rod I is removed and replaced by a post 75 which terminates at its upper end in a ball head 76 and which has its lower end reduced as indicated at 77 and passed through the arm J and rod I, the extremity of this reduced portion being threaded and carrying a castellated nut 78. The operative connection consists of a rod 79 terminating in a socket 80 and carrying a co-operating cap 81, these elements being engaged upon the ball head 76 of the post 75. The rod 79 is threaded and is screwed into a sleeve 82 which terminates in a fork 83 within which the eye 74 is pivoted by a bolt 84 or the like. A suitable lock nut 85 is provided on the rod 79 for locking the parts and preventing thread play.

In the operation of this form it will be apparent that the action is substantially the same as in both of the first described forms, the principal difference being in the location of the member carried by the steering rod and connected with the lamp standard for effecting movement thereof. This form also has the advantage of being fully adjustable in every respect whereby to insure proper installation and operation.

While I have shown and described the preferred embodiments of the invention it is of course to be understood that I reserve the right to make such changes in the form, construction and arrangement of parts as will not depart from the spirit of the invention or the scope of the subjoined claim.

Having thus described my invention I claim:

A headlamp mounting comprising a sectional ball socket member disposed upon the front axle, means for securing said socket member upon the axle, a support stationarily mounted at the forward portion of the vehicle and formed with a ball socket, a post formed of slidably and non-rotatably connected sections, said post terminating at its lower end in a ball head engaged within the first named socket and having its upper portion formed with a ball head engaged within the second named socket, a lamp supporting standard carried by the post, an arm slidably and non-rotatably mounted upon said post and terminating in a ball head, an adjustable rod having a socket connection with said last named ball head and terminating in a socket, and a ball member mounted upon the steering arm connecting rod of the vehicle and connected with said last named socket.

In testimony whereof I affix my signature.

ALFRED RAY.